United States Patent
Bae

[11] Patent Number: 5,914,917
[45] Date of Patent: Jun. 22, 1999

[54] RECORDING TABLE-OF-CONTENTS ON ERASABLE AND REWRITABLE OPTICAL DISC IN A DIGITAL VERSATILE DISC RECORDER

[75] Inventor: Hong-Moon Bae, Seoul, Rep. of Korea

[73] Assignee: Daewoo Electronics Co., Ltd., Seoul, Rep. of Korea

[21] Appl. No.: 09/050,933

[22] Filed: Mar. 31, 1998

[30] Foreign Application Priority Data

Mar. 31, 1997 [KR] Rep. of Korea ............... P 97-11706

[51] Int. Cl.⁶ .................... G11B 17/22; G11B 7/00
[52] U.S. Cl. .................................... 369/32; 369/58
[58] Field of Search ................ 369/32, 58, 68, 369/54, 59, 69, 47, 275.1, 275.3, 103; 386/95, 46, 106; 360/39, 40, 48, 49

[56] References Cited

U.S. PATENT DOCUMENTS

| | | | |
|---|---|---|---|
| 5,216,647 | 6/1993 | Kitani | 369/44.28 |
| 5,432,768 | 7/1995 | Terashima et al. | 369/58 |
| 5,537,387 | 7/1996 | Ando et al. | 369/275.1 |
| 5,617,384 | 4/1997 | Yonemitsu et al. | 369/32 |
| 5,684,770 | 11/1997 | Kim | 369/47 |
| 5,715,355 | 2/1998 | Yonemitsu et al. | 386/95 |

FOREIGN PATENT DOCUMENTS

0 621 599 10/1994 European Pat. Off. .
0 674 316 9/1995 European Pat. Off. .

*Primary Examiner*—Ali Neyzari
*Attorney, Agent, or Firm*—Pillsbury Madison & Sutro LLP

[57] ABSTRACT

In a method and an apparatus for recording a user's table-of-contents information concerning program data on an erasable and rewritable-type optical disc, a system control section records a new program data in a predetermined area of an optical disc and stores address information concerning a record start position and a record stop position of the predetermined area recorded the program data in a recording medium. System control section detects a track including the record start position and the record stop position and converts an address of a start position and a stop position of the track including the record start position into the address of the record start position and the record stop position. Also, system control section converts track numbers M+1, M+2, M+3. of tracks following a track M including the record stop position into new track numbers N+1, N+2, N+3, respectively. At this time, the M is the track number of track including the record stop position, the N is the track number of track including the record start position. System control section records the track numbers of the tracks whose track numbers are newly set, the address of the start position, and the address of the stop position on the user's table-of-contents.

12 Claims, 4 Drawing Sheets

FIG. 1

RECORDING TABLE-OF-CONTENTS ON ERASABLE AND REWRITABLE OPTICAL DISC IN A DIGITAL VERSATILE DISC RECORDER

BACKGROUND OF THE INVENTION

1. Field of the Invention

The present invention relates to a method and an apparatus for recording a user's table-of-contents (hereinafter, referred to as "UTOC") concerning the record of program data In lead-in areas of optical discs when the program data is recorded on erasable and rewritable-type optical discs.

2. Description of the Prior Art

In general, optical discs can be divided into discs for an exclusive use of reproduction, discs for an use of an additional record, and discs for an use of erasing and rewriting according to functions and uses thereof. The disc for exclusive use of reproduction is a recording medium which can only reproduce information stored in the optical disc such as a compact disc, a compact disc-read only memory (CD-ROM), a video disc and so on. Once a user records the information onto the disc for use of an additional record, the user can repeatedly read the recorded information from the disc, but cannot erase the recorded information so as to rewrite it onto the disc.

The user can erase and rewrite recorded information from and onto the disc for use of erasing and rewriting as well as the record and reproduction of the information. Optical discs which are adopted to a digital versatile disc recorder (hereinafter, referred to as "DVDR") are those for use of erasing and rewriting.

In general, the DVDR needs position information which indicates each of track numbers of the optical disc and, start and stop positions of each of tracks in order to reproduce data which is recorded on the tracks of the optical disc. Original position information is recorded in a lead-in area of the optical disc as a table-of-contents (hereinafter, referred to as a "TOC") by manufacturers of the optical discs.

When the DVDR system is directly connected to an external apparatus, e.g., a program data source apparatus such as video cassette recorder and a television set, the user can record program data supplied from the external apparatus onto a predetermined section of the optical disc.

When new program data is recorded onto a predetermined section of the optical disc for use of erasing and rewriting, the position information concerning the data which is previously recorded on the optical disc changes. Accordingly, when the data is additionally recorded onto the optical disc, the position information which indicates the track number, and the start and stop positions of the track concerning newly recorded program data have to be additionally recorded onto the optical disc in order to randomly reproduce the information which is recorded on the optical disc. At this time, the additionally-recorded position information is recorded in the form of the UTOC in the lead-in area of the optical disc. Also, the DVDR has to update alternation particulars concerning the position information of the data which is generated by recording the new program data in the UTOC.

U.S. Pat. No. 5,432,768 (granted to Shigeo Terashima et al.) entitled "METHOD AND APPARATUS FOR DATA MANAGEMENT IN OPTICAL RECORDING MEDIUM" discloses a method and apparatus for recording the above-described UTOC. According to the above method and apparatus, a TOC area includes an absolute address of a record position of each information which is recorded on an information record area. A display section schematically and independently indicates recording and non-recording areas according to the absolute address of the record position of each information piece which is recorded on the TOC area. When new information is recorded into the position of the information record area in which different information has been previously recorded, an alarm section warns the user by referring to the TOC area that different information is recorded in the position of the optical disc.

However, the above-described prior art discloses the method and apparatus which records information units having desired lengths in the information record area, and which records, onto the TOC area, contents information which indicates the absolute address of each of the information units. Accordingly, in the prior art, a method and an apparatus which reflect onto the UTOC the track number of data and the alternation particulars of the position information of each of the previous tracks caused by the additional recording of the program data, is not disclosed.

SUMMARY OF THE INVENTION

Therefore, it is an object of the present invention to provide a method for converting information of a user's table-of-contents which is related to the record of program data which is newly recorded on an optical disc.

It is another object of the present invention to provide a method by which the information of which the previous program data which is converted by recording the new program data is recorded on a user's table-of-contents.

It is a further object of the present invention to provide an apparatus for converting information of a user's table-of-contents which is related to a record of program data which is newly recorded on an optical disc.

It is a further object of the present invention to provide an apparatus in which information of previous program data which is converted by the recording of new program data is recorded on a user's table-of-contents.

In order to achieve the above objects, the present invention provides a method for recording data of a digital versatile disc recorder, which comprises the steps of:

(i) storing on a recording medium address information of a record start position and a record stop position of new program data recorded in a predetermined area of an optical disc;

(ii) detecting a track which includes the record start position and the record stop position;

(iii) converting addresses of a start position and a stop position of the track N including the record start position into addresses of the record start position and the record stop position, respectively;

(iv) converting track numbers M+1, M+2, M+3, . . . of tracks following a track M including the record stop position into track numbers N+1, N+2, N+3, . . . following track number N of the track including the record start position, respectively; and (v) recording track numbers of tracks whose track numbers are newly set, the address of the start position, and the address of the stop position in a user's table-of-contents.

In order to achieve the above objects, the present invention provides an apparatus for recording data of a digital versatile disc recorder, which comprises:

optical pick-up means for writing program data supplied from the outside on an optical disc and for reading data stored in the optical disc, a table-of-contents of the optical disc and a user's table-of-contents;

address detecting means for detecting addresses of a record start position and a record stop position of the program data written on the optical disc by said optical pick-up means;

system control means for memorizing the record start position and the record stop position from said address detecting means, for providing a control signal in order to display either the disc table-of-contents or the user's table-of-contents from said optical pick-up means, for providing a record start position search signal in response to a record start position selection signal from a user, for detecting a track number N of a track including the record start position of the program data in order to convert a start position of the track including the record start position into the record start position of the program data, for converting a stop position of the track N including the record start position into the record stop position of the program data, and for converting track numbers M+1, M+2, M+3, . . . of tracks following a track M including the record stop position into track numbers N+1, N+2, N+3, . . . following the track number N of the track including the record start position, respectively; and servo means for receiving the record start position and the record stop position of the program data from said address detecting means, for searching the record start position of the program data in response to the record start position search signal from said system control means, and for tracing said optical pick-up means to a searched record start position.

In the method and apparatus for recording data of a digital versatile disc recorder according to the present invention, position information related to a track number, start and stop positions of each track of the optical disc are recorded as a TOC in a lead-in area of the optical disc for the digital versatile disc recorder. An UTOC information area is separately allocated in the lead-in area of the optical disc. Also, data related to the track number, the start and stop positions of each track which are converted by an additional record of the program data, is recorded on the UTOC information area.

In addition, the digital versatile disc recorder refers to the UTOC information which is newly recorded in the UTOC information area in order to reproduce the data recorded on the optical disc. Consequently, the digital versatile disc recorder can accurately reproduce the data which is recorded on the optical disc.

BRIEF DESCRIPTION OF THE DRAWINGS

The above objects and other advantage of the present invention will become more apparent by describing in detail a preferred embodiment thereof with reference to the attached drawings, in which.

DESCRIPTION OF THE PREFERRED EMBODIMENT

A description will be given below in detail with reference to the accompanying drawings to a configuration and an operation of a method and an apparatus for recording data of a digital versatile disc recorder according to an embodiment of the present invention.

Figure 1:
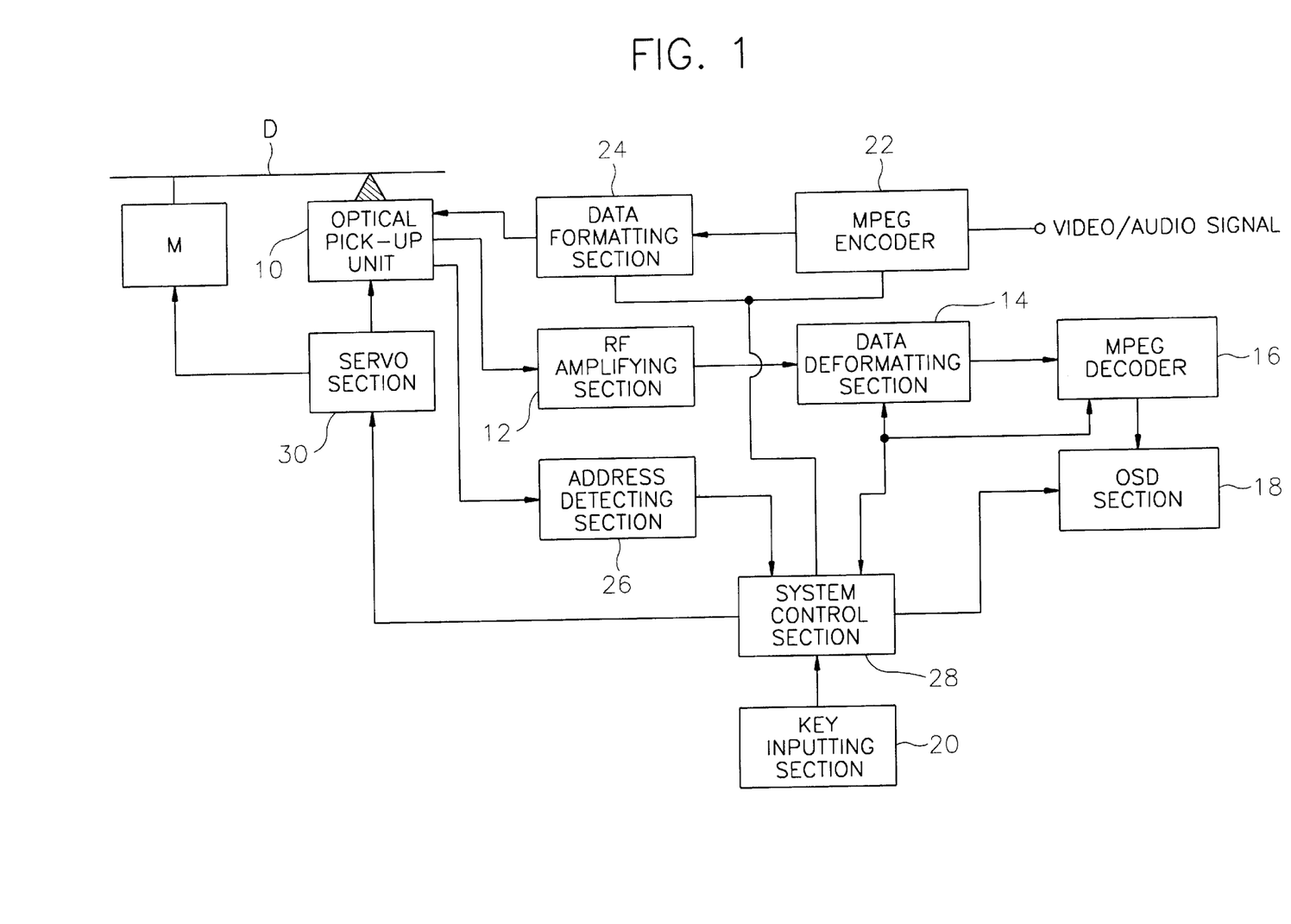
FIG. 1 is a block diagram for showing a circuit configuration of an apparatus for recording, onto an optical disc, data of a digital versatile disc recorder according to an embodiment of the present invention.

FIG. 1 is a block diagram for showing a circuit configuration of an apparatus for recording, onto an optical disc, data of a digital versatile disc recorder according to an embodiment of the present invention. As shown in FIG. 1, the apparatus for recording data of a digital versatile disc recorder comprises an optical pick-up unit 10, a radio frequency amplifying section 12, a data deformatting section 14, a moving picture experts group decoder (hereinafter, referred to as "MPEG decoder") 16, an on screen display section 18, a key inputting section 20, a moving picture experts group encoder (hereinafter, referred to as "MPEG encoder") 22, a data formatting section 24, an address detecting section 26, a system control section 28, a servo section 30, and a spindle motor M.

Optical pick-up unit 10 writes program data on an optical disc and reads the program data stored in the optical disc.

Radio Frequency amplifying section 12 amplifies a radio frequency signal which is read by means of optical pick-up unit 10.

Data deformatting section 14 demodulates the amplified signal from radio frequency amplifying section 12 by using an eight-fourteen-modulation method and executes an error correction according to a reed-solomon code.

MPEG decoder 16 releases the compression of data from data deformatting section 14.

On screen display section 18 displays the data provided from MPEG decoder 16 to a screen.

Key inputting section 20 sets operation conditions of the digital versatile disc recorder through keys thereof and provides such operation setting signals as a record start signal, a record stop signal, and a record start position selection signal which are inputted through the keys by a user to system control section 28.

MPEG encoder 22 compresses video/audio signals which are inputted from outside by using an MPEG compressing method and converts the compressed data into a data stream.

Data formatting section 24 fractionizes the data stream from MPEG encoder 22 into a sector unit and adds a sector header to each sector. Data formatting section 24 executes a reed-solomon error-correction-coding of the data to which is added the sector header.

Address detecting section 26 detects either an address signal of signal outputted from optical pick-up unit 10 or an address signal of a record start position and a record stop position of the program data which is recorded on the optical disc D by optical pick-up unit 10.

System control section 28 memorizes the record start position and the record stop position of the program data based on the address signal from address detecting section 26, and provides a control signal in order to display either the disc TOC or the UTOC from optical pick-up unit 10 to on screen display section 18. System control section 28 provides a record start position search signal to servo section 30 in response to a record start position selection signal from the user through key inputting section 20.

In addition, when the program data is recorded by the user, system control section 28 detects a track number N of track including the record start position of the program data, and converts a start position of the track N including the record start position into the record start position of the program data. System control section 28 converts a stop position of the track N including the record start position into the record stop position of the program data, and converts track numbers M+1, M+2, M+3, . . . of tracks following n track number M including the record stop position into track numbers N+1, N+2, N+3, . . . following the track number N of the track including the record start position, respectively.

System control section 28 detects an input time difference between a previous address signal and a present address signal from address detecting section 26, and supervises either whether or not optical disc D is rotated at a constant linear velocity or whether or not optical pick-up unit 10 is accurately traced on the track of optical disc D based on the detected input time difference.

Servo section 30 receives the address of the record start position and the address of the record stop position of the program data from address detecting section 26 and searches the record start position of the program data in response to the record start position search signal from system control section 28.

Also, servo section 30 controls optical disc D to be rotated at the constant linear velocity in accordance with the control of system control section 28 and executes a tracking servo optical pick-up unit 10 which is able to accurately trace on the track of optical disc D.

Spindle motor M rotates optical disc D as the constant linear velocity in accordance with the control of servo section 30.

A description will be made next of the procedure of the method for recording data of a digital versatile disc recorder which is performed by the apparatus shown in FIG. 1, in accordance with the flowchart of FIGS. 2 to 4.

Figure 2:
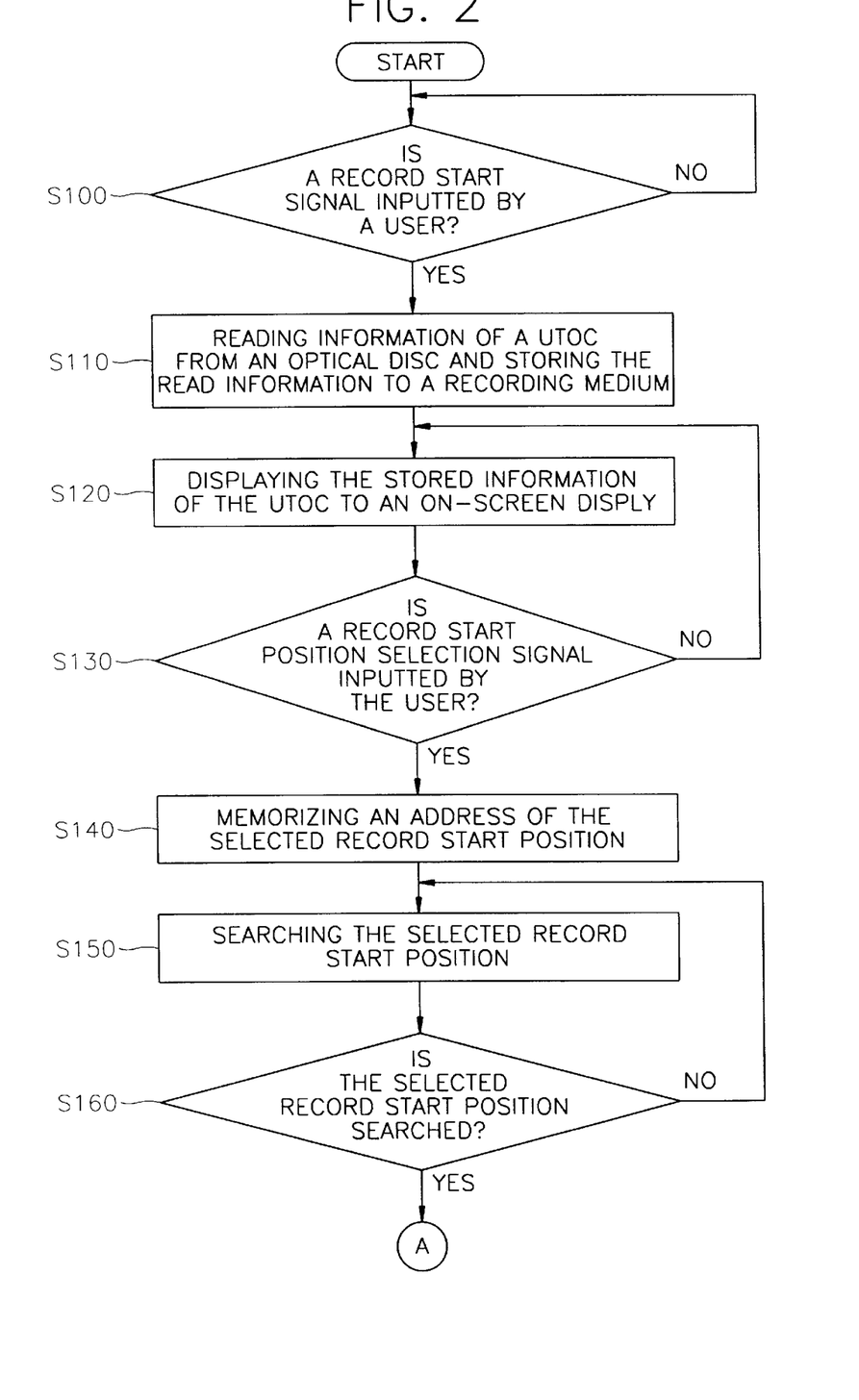
FIGS. 2 to 4 are a flowchart for illustrating a method for recording, onto an optical disc, data of a digital versatile disc recorder by using the apparatus shown in FIG. 1.
Figure 3:
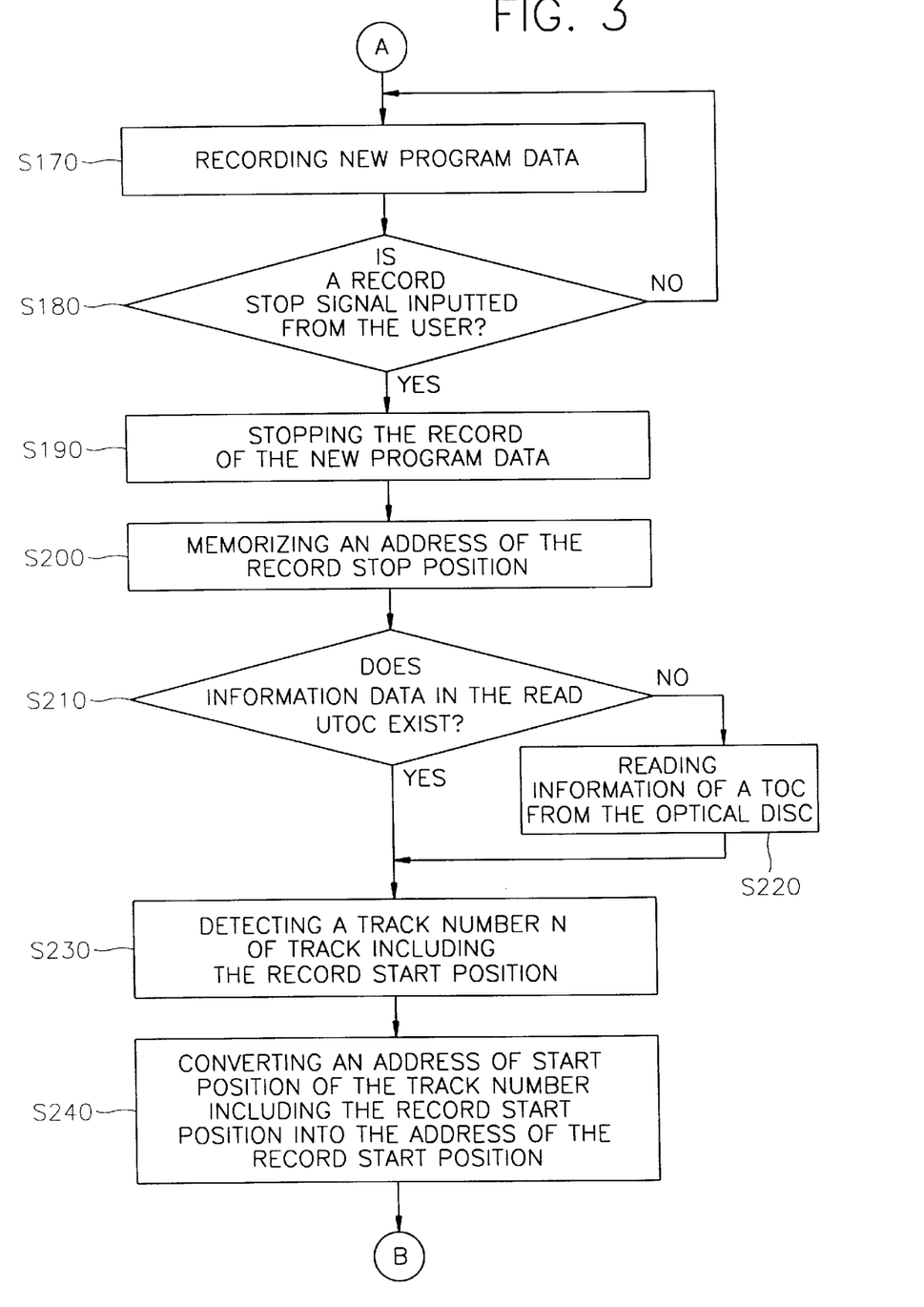
Figure 4:
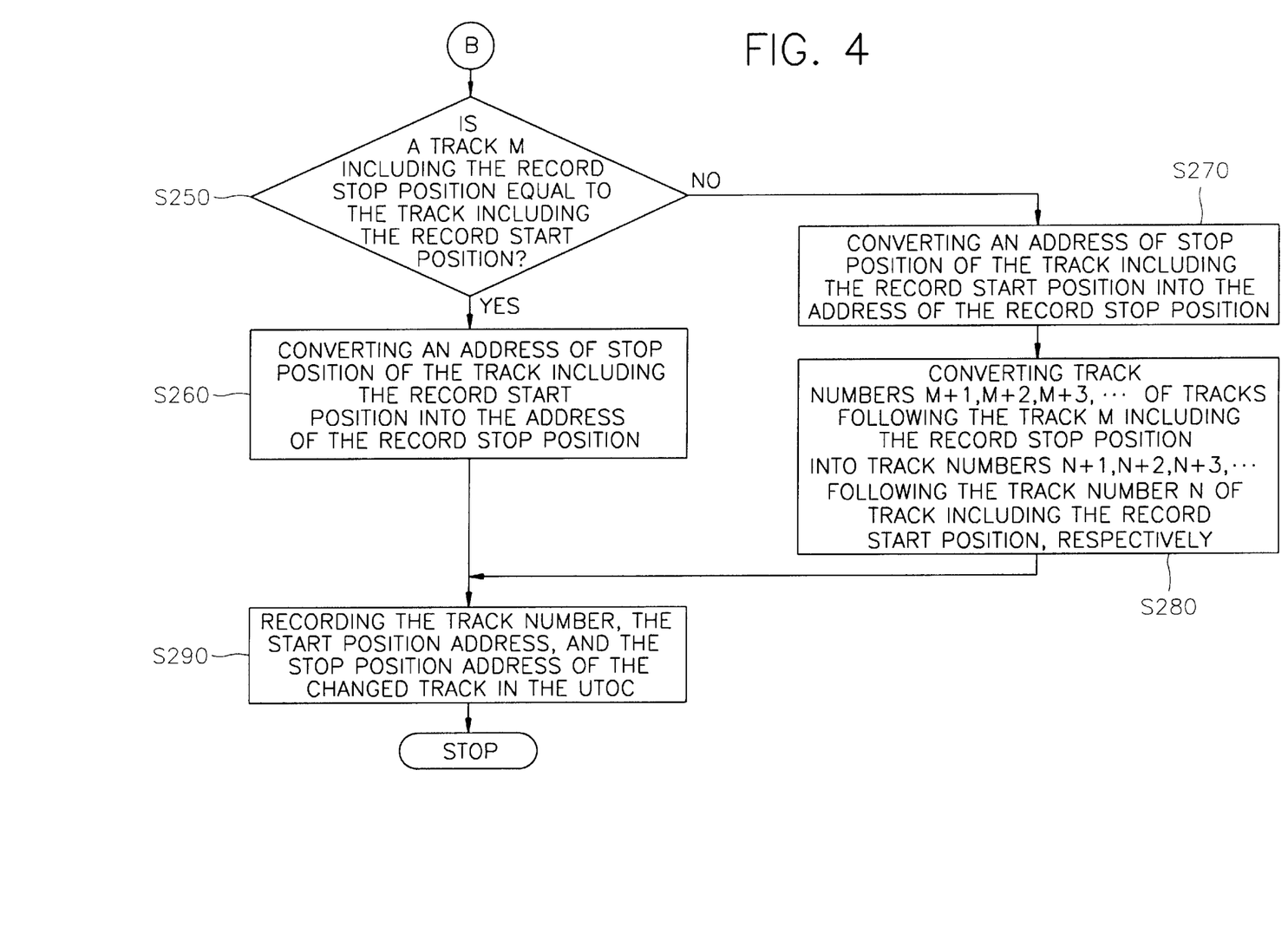

FIGS. 2 to 4 are a flowchart for illustrating a method for recording, onto an optical disc, data of a digital versatile disc recorder by using the apparatus shown in FIG. 1.

As shown in FIGS. 2 to 4, when a user inputs a record start signal in order to record a new program data using key inputting section 20, system control section 28 judges whether or not the record start signal is inputted by the user (step S100).

When it is judged in step S100 that the record start signal is inputted by the user, system control section 28 executes control operation in order to read UTOC information from an optical disc D. Optical pick-up unit 10 reads the UTOC information from UTOC information area included in lead-in a area of optical disc D according to the control from system control section 28 and provides the read UTOC information to radio frequency amplifying section 12. Radio frequency amplifying section 12 amplifies the UTOC information from optical pick-up unit 10 and provides the amplified UTOC information to data deformatting section 14. Data deformatting section 14 detects the UTOC information from radio frequency amplifying section 12 and provides the detected UTOC information to system control section 28. System control section 28 stores the UTOC information which is provided from data deformatting section 14 in a memory (step S110).

System control section 28 controls on screen display section 16 in order to display the UTOC information stored in step S110 (step S120).

System control section 28 judges whether or not a record start position selection signal is inputted by the user (step S130).

When it is judged in step S130 that the record start position selection signal is not inputted by the user, system control section 28 returns to step S120.

When it is judged in step S130 that the record start position selection signal is inputted by the user, system control section 28 memorizes an address corresponding to the record start position selection signal which is selected by the user (step S140).

System control section 28 provides a record start position search signal to servo section 30 in order to search the selected record start position, and servo section 30 searches the record start position corresponding to the record start position search signal from system control section 28 (step S150).

System control section 28 judges whether or not the selected record start position is searched (step S160). When it is judged in step S160 that the record start position which is selected in step S130 is not searched, system control section 28 returns to step S150.

When it is judged in step S160 that the record start position which is selected in step S130 is searched, system control section 28 controls servo section 30 so that optical pick-up unit 10 is jumped onto the selected record start position of optical disc D.

Optical pick-up unit 10 moves on the record start position of optical disc D according to control of servo section 30. When optical pick-up unit 10 reaches the record start position, system control section 28 records the new program data in optical disc D (step S170).

Accordingly, a video/audio signal inputted through MPEG decoder 22 and data deformatting section 24 from outside is recorded from the selected record start position of optical disc D by means of optical pick-up unit 10.

When the video/audio signal inputted from outside is recorded in a predetermined section of optical disc D, system control section 28 judges whether or not a record stop signal is inputted by the user (step S180).

When it is judged in step S180 that the record stop signal is not inputted by the user, system control section 28 returns to step S170.

When it is judged in step S180 that the record stop signal is inputted by the user, system control section 28 stops the record of the new program data (step S190).

When new data is being recorded in the predetermined section of optical disc D by means of the above described process, a track number of data which is previously recorded on optical disc D and position information of each track are changed. Accordingly, the track number and the position information of each track changed by additive recording have to be recorded in the lead-in area of optical disc D in order to randomly reproduce the program data recorded on optical disc D.

Consequently, system control section 28 memorizes addresses corresponding to a record stop position in which the record of the program data stops (step S200).

System control section 28 reads the UTOC information stored in step S110 and judges whether or not information data exists in the read UTOC information (step S210).

When it is judged in step S210 that the information data does not exist in the UTOC information, system control section 28 reads TOC information recorded on the lead-in area of optical disc D (step S220). System control section 28 detects a track number of a track including the record start position based on the TOC information read in step S220 (step S230). At this time, the TOC information is recorded by manufacturers when optical disc D is manufactured. When optical disc D is loaded in the DVDR system, the TOC information is read automatically, and the read TOC information is stored in the memory of system control section 28.

When it is judged in step S210 that the information data exists in the UTOC information, system control section 28 detects a track number of the track including the record start position based on the UTOC information memorized in step S140 (step S230).

When the track number of the track which is detected in step S230 is N, system control section 28 converts an address of the start position of the track number N into the address of the record start position (step S240).

System control section 28 judges whether or not the track including the record stop position memorized in step S200 is equal to the track number N including the record start position detected in step S230 (step S250).

When it is judged in step S250 that the track including the record stop position is equal to the track number N including the record start position, system control section 28 converts an address of the stop position of the track including the record start position into the address of the record stop position (step S260).

When it is judged in step S250 that the track including the record stop position is not equal to the track N including the record start position, system control section 28 converts the address of the stop position of the track including the record start position into the address of the record stop position (step S270). At this time, the record stop position will be included in a track number M (hereupon, M>N) following the track number N including the record start position because the record stop position will be recorded later than the record start position.

System control section 28 converts the track numbers of tracks following the track number M including the track stop position. Namely, the track number of the track having M+1, M+2, M+3, . . . as track number is converted into N+1, N+2, N+3, . . . (step S280). Also, system control section 28 rewrites information concerning the start position and the stop position of the track which is converted to the track number in the UTOC information.

System control section 28 records the rewritten track numbers of the tracks, the address of the track start position, and the address of the track stop position on the UTOC information area (step S290).

In the method and apparatus for recording data of the digital versatile disc recorder according to the present invention, position information related to a track number, start and stop positions of each track of the optical disc are recorded as a TOC in a lead-in area of the optical disc for the digital versatile disc recorder. The UTOC information area is separately allocated to the lead-in area of the optical disc. Also, data related to the track number, the start and stop positions of each track which are converted by an additional record of the program data, is recorded on the UTOC information area.

In addition, the digital versatile disc recorder refers to the UTOC information which is newly recorded in the UTOC information area in order to reproduce the data recorded on the optical disc. Consequently, the digital versatile disc recorder can accurately reproduce the data which is recorded on the optical disc.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. A method for recording data onto a recording medium in a digital versatile disc recorder, said method comprising the steps of:

(i) storing on the recording medium address information of a record start position and a record stop position of new program data recorded in a predetermined area of the recording medium;

(ii) detecting a track which includes the record start position and the record stop position;

(iii) converting addresses of a start position and a stop position of the track N including the record start position into addresses of the record start position and the record stop position, respectively;

(iv) converting track numbers M+1, M+2, M+3, . . . of tracks following a track M including the record stop position into track numbers "N+1, N+2, N+3, . . . following track number N of the track including the record start position, respectively; and (v) recording track numbers of tracks whose track numbers are newly set, the address of the start position, and the address of the stop position in a user's table-of-contents.

2. The method according to claim 1, wherein step (i) comprises the substeps of:

(i-1) displaying the information of a read user's table-of-contents on a screen for setting the record start position in response to a key operation of a user;

(i-2) recording the new program data in response to a record start position selection signal from the user; and (i-3) stopping the recording in substep (i-2) of the new program data in response to a record stop signal from the user.

3. The method according to claim 2, wherein substep (i-1) comprises the sub-substeps of:

(a) checking whether or not a record start signal in order to record the new program data is inputted by the key operation of the user;

(b) returning to step (a) when it is checked in step (a) that the record start signal is not inputted;

(c) reading the information of the user's table-of-contents and storing read information on the recording medium when it is checked in step (a) that the record start signal is inputted; and (d) displaying the information of the user's table-of-contents stored in step (c) on the screen for setting the record start position.

4. The method according to claim 2, wherein substep (i-2) comprises the sub-substeps of:

(e) checking whether or not the record start position selection signal is inputted by the user;

(f) returning to substep (i-1) when it is checked in step (e) that the record start position selection signal is not inputted;

(g) searching a record start position when it is checked in step (e) that the record start position selection signal is inputted;

(h) checking whether or not the record start position is searched;

(i) returning to step (g) when it is checked in step (h) that the record start position is not searched; and (j) recording the new program data when it is checked in step (h) that the record start position is searched.

5. The method according to claim 4, further comprising the sub-substep of:

memorizing the record start position selected by the user.

6. The method according to claim 2, wherein said substep (i-3) comprises the sub-substeps of:

(k) checking whether or not the record stop signal is inputted by the user;

(l) returning to substep (i-2) when it is checked in sub-substep (k) that the record stop signal is not inputted;

(m) stopping the record of the new program data when it is checked in sub-substep (k) that the record stop signal is inputted; and (n) memorizing an address of a position in which the record of the new program data stops.

7. The method according to claim 1, wherein said step (ii) comprises the substeps of:

(ii-1) checking whether or not information data exists in the user's table-of-contents;

(ii-2) reading a disc table-of-contents when it is checked in substep (ii-1) that the information data does not exist in the user's table-of-contents;

(ii-3) detecting the track number N of the track including the record start position based on the disc table-of-contents read in substep (ii-2); and (ii-4) detecting a track number N of the track including the record start position based on the user's table-of-contents when it is checked in substep (ii-1) that the information data exists in the user's table-of-contents.

8. The method according to claim 1, wherein said step (iii) comprises the substeps of:

(iii-1) converting the address of the start position of the track N including the record start position into the address of the record start position;

(iii-2) checking whether or not the track M including the record stop position is equal to the track N including the record start position;

(iii-3) converting the address of the stop position of the track N including the record start position into the address of the record stop position when it is checked in substep (iii-2) that the track M including the record stop position is equal to the track N including the record start position; and (iii-4) converting the address of the stop position of the track N including the record start position into the address of the record stop position when it is checked in substep (iii-2) that the track M including the record stop position is not equal to the track N including the record start position.

9. A method for recording data onto a recording medium in a digital versatile disc recorder, said method comprising the steps of:

(A) checking whether or not a record start signal in order to record a new program data is inputted by means of a key operation of a user;

(B) returning to step (A) when it is checked in step (A) that the record start signal is not inputted;

(C) reading an information of a user's table-of-contents and storing the read information on the recording medium when it is checked in step (A) that the record start signal is inputted;

(D) displaying the information of the user's table-of-contents stored in step (C) to a screen for setting a record start position;

(E) checking whether or not a record start position selection signal is inputted by the user;

(F) returning to step (D) when it is checked in step (E) that the record start position selection signal is not inputted;

(G) memorizing the record start position selected by the user when it is checked in step (E) that the record start position selection signal is inputted;

(H) searching the record start position selected by the user;

(I) checking whether or not the record start position is searched;

(J) returning to step (H) when it is checked in step (I) that the record start position is not searched;

(K) recording the new program data when it is checked in step (I) that the record start position is searched;

(L) checking whether or not a record stop signal is inputted by the user;

(M) returning to step (K) when it is checked in step (L) that the record stop signal is not inputted;

(N) stopping the record of the new program data when it is checked in step (L) that the record stop signal is inputted;

(O) memorizing an address of position in which the record of the new program data stops;

(P) checking whether or not information data exists in the user's table-of-contents;

(Q) reading a disc table-of-contents when it is checked in step (P) that the information data does not exist in the user's table-of-contents;

(R) detecting a track number N of the track including the record start position based on the disc table-of-contents read in step (Q);

(S) detecting the track number N of the track including the record start position based on the user's table-of-contents when it is checked in step (P) that the information data exists in the user's table-of-contents;

(T) converting an address of the start position of the track N including the record start position into the address of the record start position;

(U) checking whether or not a track M including the record stop position is equal to the track N including the record start position;

(V) converting an address of the stop position of the track N including the record start position into an address of the record stop position when it is checked in step (U) that the track M including the record stop position is equal to the track N which including the record start position;

(W) converting the address of the stop position of the track N including the record start position into the address of the record stop position when it is checked in step (U) that the track M including the record stop position is not equal to the track N including the record start position;

(X) converting track numbers M+1, M+2, M+3, . . . of tracks following the track M including the record stop position into track numbers N+1, N+2, N+3, . . . following the track number N of the track including the record start position, respectively; and (Y) recording track numbers of the tracks whose track numbers are newly set, the address of the start position, and the address of the stop position in the user's table-of-contents.

10. An apparatus for recording data onto a recording medium in a digital versatile disc recorder, said apparatus comprising:

optical pick-up means for writing program data supplied from the outside on an optical disc and for reading data stored in the recording medium, a table-of-contents of the recording medium, and a user's table-of-contents;

address detecting means for detecting addresses of a record start position and a record stop position of the program data written on the recording medium by said optical pick-up means;

system control means for memorizing the record start position and the record stop position from said address detecting means, for providing a control signal in order to display either the disc table-of-contents or the user's table-of-contents from said optical pick-up means, for providing a record start position search signal in response to a record start position selection signal from a user, for detecting a track number N of a track including the record start position of the program data in order to convert a start position of the track including the record start position into the record start position of the program data, for converting a stop position of the track N including the record start position into the record stop position of the program data, and for converting track numbers M+1, M+2, M+3, . . . of tracks following a track M including the record stop position into track numbers N+1, N+2, N+3, . . . following the track number N of the track including the record start position, respectively; and servo means for receiving the record start position and the record stop position of the program data from said address detecting means, for searching the record start position of the program data in response to the record start position search signal from said system control means, and for tracing said optical pick-up means to a searched record start position.

11. The apparatus according to claim 10, further comprising:

on screen display means for displaying either the disc table-of-contents or the user's table-of-contents from said optical pick-up means in response to the control signal from said system control means.

12. The apparatus according to claim 11, wherein said record start position selection signal is selected based on either the disc table-of-contents or the user's table-of-contents displayed to said on screen display means.

* * * * *